(12) United States Patent
Gamboa Tuesta et al.

(10) Patent No.: US 8,584,041 B2
(45) Date of Patent: Nov. 12, 2013

(54) GRAPHICAL USER INTERFACE WITH A CONCENTRIC ARRANGEMENT AND METHOD FOR ACCESSING DATA OBJECTS VIA A GRAPHICAL USER INTERFACE

(75) Inventors: Dirk Gamboa Tuesta, Berlin (DE); Markus Schulz, Berlin (DE)

(73) Assignee: Markus Schulz, Berlin (DE)

( * ) Notice: Subject to any disclaimer, the term of this patent is extended or adjusted under 35 U.S.C. 154(b) by 531 days.

(21) Appl. No.: 12/856,313

(22) Filed: Aug. 13, 2010

(65) Prior Publication Data

US 2012/0042283 A1   Feb. 16, 2012

(51) Int. Cl.
*G06F 3/048* (2013.01)
*G06F 3/14* (2006.01)

(52) U.S. Cl.
USPC ............................ 715/834; 715/804; 715/864

(58) Field of Classification Search
USPC .......................................... 715/834, 804, 864
See application file for complete search history.

(56) References Cited

U.S. PATENT DOCUMENTS

| | | | | |
|---|---|---|---|---|
| 6,236,398 B1 * | 5/2001 | Kojima et al. | ................ | 345/419 |
| 6,448,987 B1 * | 9/2002 | Easty et al. | ................... | 715/834 |
| 6,795,097 B1 * | 9/2004 | Yamaguchi et al. | .......... | 715/810 |
| 6,816,079 B1 * | 11/2004 | Kuenzner et al. | .......... | 340/815.4 |
| D563,972 S * | 3/2008 | Sherry | ......................... | D14/487 |
| 7,555,476 B2 * | 6/2009 | Holbrook | .............................. | 1/1 |
| 7,681,150 B2 * | 3/2010 | Hsieh et al. | ................... | 715/854 |
| 2003/0048309 A1 * | 3/2003 | Tambata et al. | ............... | 345/810 |
| 2004/0250217 A1 * | 12/2004 | Tojo et al. | ..................... | 715/810 |
| 2005/0050476 A1 * | 3/2005 | SanGiovanni | ................ | 715/834 |
| 2006/0048076 A1 * | 3/2006 | Vronay et al. | ................ | 715/850 |

* cited by examiner

*Primary Examiner* — David Phantana Angkool
(74) *Attorney, Agent, or Firm* — Edell, Shapiro & Finnan LLC

(57) ABSTRACT

A graphical user interface (1) and a method (20, 27) for providing access to task data objects as well as a method (37, 44) for navigating through a set of task data objects is provided. The graphical user interface (1) may comprise a reference area (2) representing a reference data object and at least one classification belt (3, 4, 10) in a concentrical arrangement. On the classification belts (3, 4, 10) at least one task area (5) representing a task data object can be displayed. The classification belt (3, 4, 10) may at least partly surround the reference area (2). The method (20, 27) for providing access to task data objects may comprise the steps of comparing data entries of task data objects with classes of data entries and the step of displaying task areas (5) on the classification belts (3, 4, 10) based on the comparison. The method (37, 44) for navigating may comprise the steps of radially or rotationally scrolling of the classification belts (3, 4, 10).

30 Claims, 8 Drawing Sheets

GRAPHICAL USER INTERFACE WITH A CONCENTRIC ARRANGEMENT AND METHOD FOR ACCESSING DATA OBJECTS VIA A GRAPHICAL USER INTERFACE

TECHNICAL FIELD

This patent application generally relates to providing access to data objects via a graphical user interface, in particular, to a graphical user interface, a computer-implemented method for providing access to data objects via a graphical user interface and a computer-implemented method for navigating through a set of data objects on a graphical user interface.

BACKGROUND

There exist many ways for providing access to data objects. In particular, data objects that are hierarchically associated with other data objects are often provided on the graphical user interface represented by entries of a list. The first entry represents a reference data object and the following entries represent task data objects that are associated with the reference data object by e.g. a link. The order of the task data objects in the list may represent a rating of a relation between each of the task data objects and the reference data object.

Such a list presentation of data objects may be confusing, especially if many data objects are displayed or if next to the rating of the relation other attributes are to be displayed. Scrolling long lists for accessing a certain task data object is time consuming, especially if the list contains task data objects in a two dimensional sorting.

OBJECT

In view of these disadvantages of the known graphical user interfaces and methods for providing access to data objects, an object of the invention is to provide access to data objects in a clearly structured and easy way.

DETAILED DESCRIPTION

The object is achieved by a first implementation of the graphical user interface mentioned in the beginning, the user interface may comprise a presentation area, the presentation area including a reference area that is representative of the reference data object, at least one classification belt, which at least partly surrounds the reference area in a concentric arrangement, e.g. completely or partly surrounding the reference area, for instance as a full or semicircle, at least one task area that is representative of a task data object, the task data object and the reference data object being linked to each other and the task area being located in the at least one classification belt.

In a further implementation of the graphical user interface by which the object is achieved, the graphical user interface may comprise a presentation area, the presentation area including a reference area that is representative of the reference data object, at least two classification belts including a first and a second classification belt, the first and the second classification belt at least partly surrounding the reference area in a concentric arrangement and the first classification belt being arranged at a smaller distance to the reference area than the second classification belt and at least one task area that is representative of a task data object, the task data object and the reference data object being linked to each other and having a known relation that is represented by at least one rating data entry, wherein each of the at least two classification belts represents a rating class of possible rating data entries and wherein the task area is located in the classification belt, the rating class of which comprises the rating data entry of the task data object represented by the task area.

Furthermore, the graphical user interface according to the above implementations may comprise at least one critical position marker, which is arranged at a predetermined angular position, the critical position marker representing a fixed limit value of a status data entry for the task data object, wherein the difference between the limit value and the status data entry is represented by an angular distance between the task area and the critical position marker.

These simple solutions provide that the task areas are arranged in the classification belts based on the rating and/or the status data entries to enable a user to quickly access the task data objects belonging to a certain rating class or having a certain status. Furthermore, the graphical user interface may provide access to a program or an operating system of a computing device, enabling the user to interact with the program or operating system.

The solutions can be combined as desired and further improved by further following embodiments of implementations that are advantageous on their own, in each case.

The reference area, the task areas and each of the classification belts can be displayed visually distinguishable from each other, for assisting the user to quickly access certain data objects. The status of the task data object with reference to a predetermined goal or target can easily be understood by the user by the angular distance between the task are and the critical position marker. Furthermore, the task areas can be shaped with diverse designs, e.g. all task areas of task data objects belonging to one rating class can be of the same shape and all task areas of task data objects of another rating class can have a different design.

The above implementations of the graphical user interface may comprise the following technical items and structures:

Data objects may comprise data entries, which classify the data object as a certain data object type, particular as a reference data object, a task data object or a critical position data object.

Critical position and task data objects may be linked to the reference data object by link data entries, which can be associated with the reference data object or the task and the critical position data objects. Link data entries can comprise an expression of the relationship between the linked objects and may further comprise a name of the linked data object, a pointer or any other data identifying the data objects that are linked.

Furthermore, data objects can comprise rating data entries. In particular, rating data entries can represent the quality of the known relation between the reference data object and the task or the critical position data object. For instance, rating data entries with high values can represent a close relationship between persons of an address book, each person being represented as a data object, and low values represent a distant relationship between the persons.

Moreover, data objects and in particular task data objects, can comprise a status data entry representing a status with reference to a target. The status data entry can be variable and change due to a user action or upon a certain event, the event being a trigger event like a predetermined interval elapsed event. The target can be represented by a target data entry of the reference data object or the critical position data object, the target data entry being a preset limit value of status data. The present limit value can be a fixed value that may be alterable by the user or upon a certain event. By this, the status data entry can easily be kept up to date.

The critical position data object can be represented by the critical position marker that is placed on the graphical user interface indicating a predetermined or user-chosen angular critical position with respect to the reference area. For instance, the predetermined angular position can be arranged in the 12 o'clock position of the graphical user interface or between the 12 o'clock position and the reference area. The angular position of the critical position marker may be changeable by the user, possibly resulting in a change of the limit value, or during a navigation process.

The critical position marker can comprise a pre-critical zone or may be arranged on the graphical user interface indicating at an end of the pre-critical zone. The pre-critical zone may extend along a belt direction in which the classification belt extends and have a predetermined length around the reference area, the length being between 0° and 90°, 15° and 45° or 30°. If the critical position marker is arranged in the 12 o'clock position, the pre-critical zone can extend between the 12 o'clock position and the 11 or 1 o'clock position.

If a task area reaches a critical position, i.e. the distance between the critical position marker and the task area reaches a predetermined value or is minimum, one of the data entries of the represented task data object, e.g. the rating data entry, can automatically be increased or decreased, such that the task area is moved to another classification belt. Also, the rating data entry can remain unchanged and the task area can still be shown in the same classification belt and may be placed beyond the critical position. In this case, crossing the critical position, which can be interpreted as missing the target, can be indicated by a changed appearance of the task area. For instance, the form or the colour of the task area can change. Furthermore, by reaching the critical position, the type of the task data object can be changed, e.g. to the reference data object type.

The reference area, being representative of the reference data object, may be displayed on the graphical user interface, e.g. in a central position. The reference area and the at least one task area can be displayed as a view of a list containing an icon view, a thumbnail picture view, a content view and an application view. In an icon view, a default picture may be used to represent a data object. A thumbnail picture view displays a miniature version of a picture linked to the data object. If the picture view is chosen, the linked pictures can be displayed at normal size. Certain content of the data object or a content data linked to the data object can be displayed in the area. In an application view, the area may show a picture-, an icon-, or a text-link to an executable program.

At least the task area may be adapted to be movable, especially along one classification belt, from one classification belt to another classification belt or to the reference area. Moving of the task area along the classification belt is representative of a change of the status data entry of the task data object represented by the task area. In particular, the task area can be movable towards the critical position marker and along the classification belt direction in which the classification belt extends. The classification belt direction may vary along the course of the classification belt, which can be essentially circular, elliptical, polygonal or star-shaped and which can surround the reference area completely or only partly. Different classification belts can have the same or different forms. Thus, if the task area is moved to the reference area, it may become a replacement object for the reference data object.

Upon replacement of the reference data object by one task data object, task data objects linked to the one task data object, now being the reference data object, can be displayed on the classification belt. Also, a new critical position marker may be shown on the graphical user interface, if it is linked to the one task data object that now replaces the former reference data object.

For instance, the reference data object can represent a person and the task data object the person's friend in a social network. If one of the task areas that refer to one of the friends is moved to the reference area, the friends of this one friend are displayed.

The data objects can alternatively represent tasks of a project, the reference data object referring to a main task, which comprises sub-tasks, the sub-tasks being represented by task data objects and the respective task areas. If the task area of one of the sub-tasks is moved to the reference area, task elements of the sub-tasks may be displayed by the task area. Furthermore, if the reference area moves to a classification belt, another reference data object can be represented by a new reference area, provided that the former reference data object is linked to only one other reference data object. If it is linked to more than one reference data object, a user action may be required. The new reference area can represent a super ordinate task.

A change of the rating data entry is represented by moving the task area to another section or classification belt. A change of type of the data object is represented by a movement from or to a classification belt to or from the reference area or the critical position marker.

By the movement of the data objects, data entries can easily be changed or a change of a data entry is illustrated in an easily comprehensible way. The user-introduced movement may be a drag-and-drop action. Furthermore, the interaction between the user and the graphical user interface can be gesture-based. The gestures may be performed by the user by using one or more fingers that interact with a touch screen, a camera or another sensing device of the computing device. A gesture may comprise moving fingers along a predetermined pattern that is associated with a desired action, e.g. the movement of the task area, scrolling, shifting or zooming of elements of the graphical user interface.

Moreover, an interaction with the graphical user interface may not only result in a movement of an area or classification belt or in a zooming, scrolling of shifting action. Rather, interacting with the graphical user interface may also result in at least temporarily displaying or hiding areas, belts or optional objects. The optional objects may comprise user desired actions, like saving, opening, editing, deleting or printing dialogues. Activating an area or belt for instance by touching and holding the area or the belt, may result in at least a temporarily hiding or displaying of data objects, belts or the optional objects.

Furthermore, the graphical user interface may be provided with function objects for receiving user actions like changing the layout of a screen keyboard or switching to another graphical user interface or program. The function objects may be arranged within or next to or at a distance to the belts. For instance, the function objects may be shaped as a virtual button represented by a function area on the presentation area with a certain design which makes it distinguishable from other items of the graphical user interface. The function area may for instance be arranged in areas of the presentation area that can easily be reached by the user, e.g. in corners or at edges of the presentation area.

The graphical user interface can comprise at least one further task area, which represents one further task data object and which can be located in one of at least two classification belts. The further task data object can be linked to the current reference data object, which may be a former task data object, now replacing the former reference data object.

At least one class of data entries, e.g. a class of status or reference data entries, can be provided as a set of possible data entries. The set can be arbitrarily chosen from possible data entries. For sorting purposes, it is advantageous if a class of data entries comprises a range of possible data entries, wherein the range can contain a coherent or continuous set of possible data entries. Several classes of data entries can overlap, i.e. comprise an intersection, the classes can be separate classes with no overlap or even with a gap in between.

Each class can be associated with one classification belt. In particular, classification belts belonging to different classes of possible data entries can have different average diameters. For instance, classification belts associated with a higher class of possible rating data entries, which may represent good friends of a reference person, can have a larger diameter compared to a classification belt that is associated with a lower class of possible rating data entries. The classification belts can be arranged analog to the mathematical arrangement of the classes with gaps between the belts, with direct contact between at least two belts or with overlapping belts.

A class of status data entries can be represented by a section of the classification belt, wherein the size of the section can be proportional to the amount of possible status data entries in the class, to the amount of task data objects belonging to the class or to the maximum or average value of possible status data entries gathered in the class. If low values of possible status data entries are representative of a high importance or a high priority, the size of the section can be proportional to the minimum or average value of each class.

The graphical user interface may comprise several task areas, each task area being arranged on the classification belt that represents the rating class that comprises the rating data entries of the task data objects that are represented by the task area. Easy and well structured access to data objects based on the rating is provided.

In order to avoid that a classification belt or one of its sections is overcrowded by too many task areas of task data objects belonging to the same rating or status class, at least two task areas can be displayed in a grouped view instead of a separate view, the grouped view being one view of a list containing a stack view or a placeholder view. An object density threshold, that can be a threshold data entry, which is associated with the classification belt or the respective section, can be provided for determining the kind of view. The object density threshold can define a maximum density of task areas in one of the classification belts or in a segment of the classification belt.

If the density of task areas in the classification belts or in the segment is below the maximum density defined by the density threshold, the task areas are displayed independent of each other. As soon as the task area density reaches or exceeds the maximum density value, the task areas are grouped and are displayed as a stack view, in which they overlap each other, or are displayed by a placeholder, that may display the amount of grouped task areas by showing a number.

The solutions concerning the computer-implemented methods may also be combined as desired and further improved by the following embodiments of implementations that are advantageous on their own in each case.

The implementation of the computer-implemented method for providing access to task data objects via a graphical user interface mentioned in the beginning, may further comprise the steps of displaying at least two classification belts in a concentric arrangement and at least partially surrounding the reference area, comparing a rating data entry with at least two rating classes of possible rating data entries, each class being associated with one of the at least two classification belts and displaying the at least one task area with one of the at least two classification belts based on the comparison.

Furthermore, the computer-implemented method for providing access to task data objects via a graphical user interface mentioned in the beginning may comprise the steps of displaying at least one classification belt in a concentric arrangement with and at least partially surrounding the reference area and at least one critical position marker in a predetermined angular position with respect to the reference area, comparing a status data entry with a limit value and displaying the at least one task area on the at least one classification belt at an angular distance to the critical position marker, the angular distance being representative of a result of the comparison of the status data entry and the limit value.

The above implementations of the method for providing access may further comprise at least one of the following steps:

The status data entry may be updated upon a predetermined trigger event, which is one event of a list containing a data entry event and an end of a predetermined interval event. The trigger event may be caused on a computing device that hosts the graphical user interface or on a remote computing device that is in data communication with the graphical user interface. The trigger event may be caused manually, e.g. by a user entering data or by data that was entered by a user with a time lag to the trigger event, or automatically, e.g. dependent on a lapsed time interval or by passing a limit value.

The task area of the respective task data object may be moved the along its classification belt, e.g. by a drag-and-drop action. Alternatively, the data entry event can be a manual or automatic update of a data structure that is associated with the task data object. For instance, storing new software code for a software development project in a project data base would be a manual data entry event, upon which the position of the task area is automatically updated. A manual update of a project plan is not necessary. Up to date status of the project can be displayed by an automatically updated Gantt chart displayed as a graphical user interface as disclosed in this document.

The predetermined interval can be a finite time interval in which a certain action, e.g. writing software code and storing it in the project data base, has to be completed. If the interval elapses without the action completed, the status data is updated, maybe representing a warning status.

If the update leads to a status data entry that is beyond the limit value, thus if it is larger or smaller than the limit value, at least one further step can be executed. The step may be a step of a list containing giving a signal, e.g. a visual signal on the graphical user interface, or via a signalling device or an audible signal. Further, the list may also contain steps like changing the appearance of the respective task area, changing the rating data entry of the task data object and moving the task area to the reference area. Staying with the above example of the software project, details or task elements, which are part of the sub-project "Write Software Code" can be displayed by task areas upon movement of the relevant task area to the reference area.

In another implementation, a computer-implemented method for navigating through a set of task data objects on the graphical user interface is provided, wherein the method may comprise the method for providing access to task data objects via a graphical user interface mentioned above. Furthermore, the method for navigating may comprise the steps of accessing the set of task data objects and at least section-wise displaying the reference area on the graphical user interface.

The method for navigating may comprise the steps of at least section-wise displaying the at least one classification belt and the at least one task area representing one task data object of the set of task data objects on the graphical user interface and radially scrolling the at least one classification belt over the presentation area, wherein by radial scrolling of the classification belt, an average diameter of the classification belt is increased or decreased.

Moreover, the implementation of the method for navigating mentioned in the beginning may further comprise the steps of displaying at least one of the at least two classification belts and the at least one task area representing one task data object of the set of task data objects at least section-wise on the graphical user interface. Further, the method may comprise the step of radially scrolling the at least one classification belt over the presentation area, wherein by radial scrolling of the classification belt, an average diameter of the classification belt is increased or decreased.

Further, at least one of the classification belts can be scrolled rotationally. For example, the size of the classification belt can be changed and in particular increased or decreased along the belt direction. By changing the size of the classification belt, a different amount of data objects can be displayed if the length of the classification belt is increased. Alternatively, rotational scrolling may lead to a change of scale so that more or less data objects can be shown in the scrolled classification belt. Especially task data objects with a status data entry that significantly differs from the target data entry can be shown if the scale is reduced. By enlarging the scale, less task areas can be shown with more detail. Moreover, the period shown in the classification belt can be moved without changing the size of the classification belt. By this way of scrolling, the classification belt travels through the period.

Furthermore, the method for navigating may comprise the steps of displaying at least section-wise on the graphical user interface at least one of the at least two classification belts and the at least one task area representing one task data object of the set of task data objects, moving the at least one task area in the reference area and executing the step of refreshing the graphical user interface with task areas representing task data objects that are linked to the at least one task data object.

Moreover, the method for navigating may comprise the steps of displaying at least section-wise on the graphical user interface, the at least one classification belt, the at least one critical position marker and the at least one task area representing one task data object of the set of task data objects and moving the at least one task area in the reference area and executing a step, the step being one of a list comprising moving the at least one critical position marker based on a target data entry of the task data object represented by the at least one task area.

The implementation may comprise a computing device having a display, the computing device comprising a graphical user interface, the graphical user interface being shaped as described above. Furthermore, the implementation may comprise a computing device having a display with a graphical user interface, the computing device comprising code executable to display task data objects on the graphical user interface according to the above.

Moreover, the implementation may comprise a computer-readable medium, storing instructions that are executable by a processing device and upon such execution, cause the processing device to carry out a method as described above or to display a graphical user interface according to the above.

BRIEF DESCRIPTION OF THE DRAWINGS

Possible implementations of the invention will be described hereinafter in greater detail and in an exemplary manner using the advantageous embodiments and with reference to the drawings. The described embodiments are only configurations in which, however, the individual features as described above can be provided independently of one another or can be omitted in the drawings.

DETAILED DESCRIPTION OF THE DRAWINGS

Figure 1:
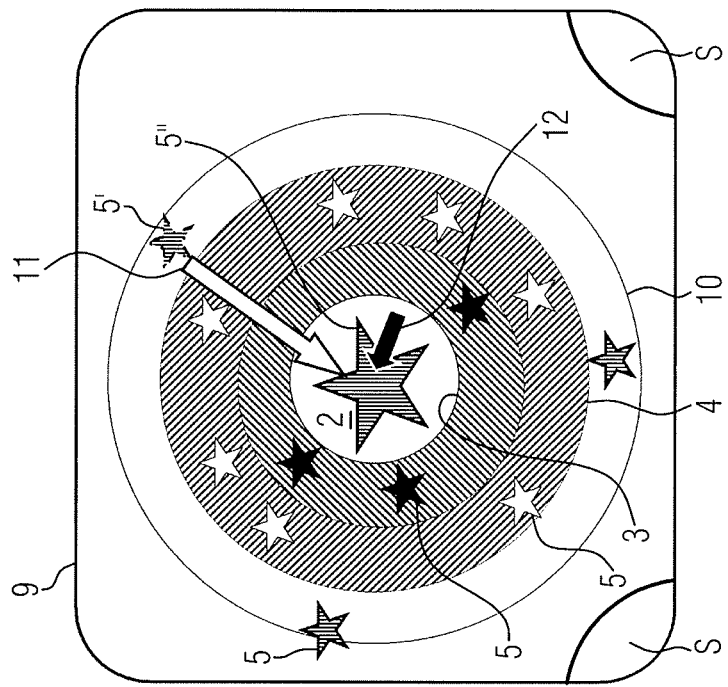
FIG. 1 is a schematic view of an exemplary embodiment of the graphical user interface.

First, a graphical user interface 1 will be described with reference to FIG. 1. The graphical user interface 1 may comprise a reference area 2, which is shown in the exemplary embodiment surrounded by two classification belts 3, 4. In some embodiments, the classification belts 3,4 may have the shape of a ring. Alternatively, the classification belts 3, 4 can have an elliptical, a polygonal or a star shape. Each of the classification belts 3, 4 may be representative of a class of possible rating data entries of task data objects. Task areas 5 may be arranged on the classification belts 3, 4. Each of the task areas 5 may be representative of one task data object. The reference area 2 can be representative of a reference data object. The graphical user interface 1 may provide access to a computing device. For instance, it may provide access to a program running on the computing device or to an operating system of the computing device. The graphical user interface 1 may enable the user to interact with the program or the operation system.

Furthermore, a critical position marker 6 may be shown on the graphical user interface 1.

In the shown embodiment, the classification belts 3, 4 may have a ring shape and may surround the reference area 2 completely. The inner or first classification belt 3 can be arranged between the reference area 2 and the outer or second classification belt 4. The classification belts 3, 4 and the reference area 2 may be displayed on the graphical user interface 1 in a concentric arrangement, in which the centres of the classification belts 3, 4 and the reference area 2 coincide. The classification belts 3, 4 may have a different average diameter and may be separated by a ring-gap 7 that is arranged between the classification belts 3, 4.

The task data objects that are represented by the task areas 5 may comprise rating data entries that are part of at least one of the classes of possible rating data entries. Each class can be represented by one of the classification belts 3,4. Task areas 5 belonging to the class of possible rating data entries represented by the outer classification belt 4 are shown on the classification belt 4. For example, the outer classification belt 4 may represent a class of possible rating data entries with the number 3. The inner classification belt 3 represents a class of possible rating data entries with the number 2. Task areas 5 of task data objects of this class number 2 are shown in the inner classification belt 3.

The task areas 5 may be designed to be movable along the classification belts 3, 4 in a belt direction d, in which the classification belts 3, 4 extend around the reference area 2. In some embodiments, belt direction d can point clockwise. Alternatively, it may also may direct counter-clockwise. An angular distance A between the task areas 5 and the critical position marker 6 may represent a status data entry of the task data object of the task area 5.

The task areas 5 may move towards the critical position marker 6 that can extend between the reference area 2 and the 12 o'clock position of the graphical user interface 1. The critical position marker 6 may be shaped as the hand of a clock in some embodiments. The angular distance A along the belt direction d between the critical position marker 6 and the task areas 5 may represent a difference between the status data entry of task data objects represented by the task areas and a target data entry of a critical position data object represented by the critical position marker 6. For example, if the difference between the target data entry and the status data entry is minimum, e.g. zero, or maximum, the distance between the critical position marker 6 and one of the task areas 5 can be minimum.

Alternatively, one of the task areas 5 may have passed the critical position marker 6 in the belt direction d. A task area 5 that has already passed the critical position marker 6 is marked by 5'. Passing the critical position marker 6 can result in a change of appearance of the task area 5'. In some embodiments, however, passing the critical position marker 6 may result in a change of the rating data entry of the task data object represented by task area 5'. Hence, task area 5' may have moved from the outer classification belt 4 to the inner classification belt 3, now belonging to class number 2 and being labelled with 5".

Further position markers may be provided, which may represent critical position markers 6, for instance of subtasks or milestones leading towards at least one critical position marker 6, which can represent an end of a task or a project, at which an action of the user is required.

Both, the rating and the status data entries may be varied automatically or manually upon a user entry event or an end of interval event. A change of the status data entry can be represented by a movement of the respective task area 5 along the classification belts 3, 4 and in particular, parallel to the belt direction d. A change of the rating data entry may be represented by a movement of the task area 5 to another classification belt 3, 4.

Furthermore, data objects may in some embodiments comprise type data entries that classify the data object as a reference data object, a task data object or a critical position data object. A change of type can be represented by a movement of the respective area or marker to one of the belts, the reference area or onto the critical position marker.

Data entries can be edited by moving areas or the marker manually, e.g. by a drag-and-drop action by a user. Alternatively, the entries can automatically or manually be changed, resulting in the movement of the area or marker, as shown by example of task area 5', that has been moved from the outer classification belt 4 (originally marked by a task area with dashed border) to the inner classification belt 3. The change of the rating data entry is shown by the number displayed in the task areas 5', 5". In the shown embodiment, the rating data entry was changed because the task area 5' had crossed the critical position marker 6 in the belt direction d, resulting in a change of the rating data entry.

If the density of task areas in one of the classification belts 3, 4 or in a part or section of the classification belts 3, 4, is above a density threshold, the task areas 5 can be displayed in a grouped view, e.g. by a placeholder. In some embodiments, however, the grouped view can be a stack view 8 in which the task areas 5 overlap each other. The density threshold can be associated to at least one of the classification belts 3, 4 or to a part or section of the classification belts 3, 4 and may be represented by a density threshold data entry.

Figure 2:
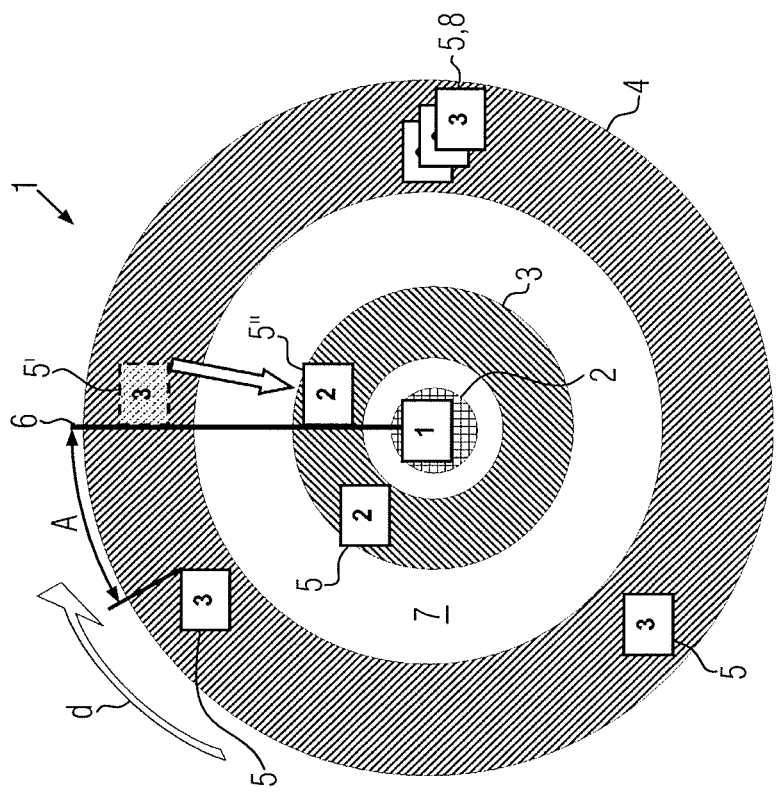
FIG. 2 is a schematic view of another exemplary embodiment of the graphical user interface.

FIG. 2 shows another exemplary embodiment of the graphical user interface with a presentation area 9. Same reference signs are being used for elements, which correspond in function and/or structure to the embodiment of FIG. 1. For the sake of brevity, only the differences from the exemplary embodiment of FIG. 1 will be looked at.

In some embodiments and in particular in FIG. 2 a third classification belt 10 can be shown, that may surround the reference area 2 and the first and the second classification belts 3, 4. The diameter of the third classification belt may be larger than the diameters of the first and the second classification belts 3, 4. The third classification belt 10 may represent a third class of possible rating data entries. More classification belts may be added.

In some embodiments, the second classification belt 4 may fit snugly between the first and the third classification belts 3, 10. The classification belts 3, 4, 10 may be visually distinguishable from each other. In some embodiments, the classification belts 3, 4, 10 can have different patterns. Alternatively, or additionally, the appearance of the classification belts 3, 4, 10 can vary by colouration etc.

The task areas 5 may in some embodiments be shown in an icon view. Each icon can have a star shape. Alternatively, the icons can have a different shape or the task areas may be presented as a thumbnail picture, a link to an executable application or program, as a scaled down content of a file or as a text. The membership of the task data objects that are represented by the task areas 5 to any of the classes of possible rating data entries may in addition to the placement of the task areas 5 on the classification belts 3, 4 10 be marked by different patterns of the icons.

Task area 5' may have been manually moved to the reference area 2. This is indicated by the dashed border of the former position of the task area 5' on the third classification belt 10, arrow 11, which indicates the movement, and black arrow 12. Black arrow 12 is shown on the former task area 5', now being task area 5", implying that the drag-and-drop action is not yet finished. The black arrow 12 does not necessarily need to represent a mouse pointer, as such a pointer is not necessary when the graphical user interface 1 is used with a touch screen. The task area 5' may have been moved as a result of a gesture from the user, e.g. moving one or more fingers in a predetermined pattern that is for instance associated with a moving action concerned with the task area 5'.

At the latest when the drag-and-drop action is finished, the graphical user interface 1 may be refreshed and show task areas 5 whose task data objects are linked to the task data object of the moved task area 5". After the drag-and-drop action, the task data object represented by the moved task area 5" may replace the current reference data object.

Furthermore, the graphical user interface 1 may be provided with function areas S for receiving user actions like changing the layout of a screen keyboard or switching to another graphical user interface or program. The function areas S may be arranged within or next to or at a distance to the belts 3, 4, 10. For instance, the function areas S may be shaped as a virtual button represented by a section on the presentation area 9 with a certain design which makes it distinguishable from other items of the graphical user interface 1. The function areas S may for instance be arranged in sections of the presentation area 9 that can easily be reached by the user, e.g. in corners or at edges of the presentation area 9.

Moreover, an interaction with the graphical user interface 1 may not only result in a movement of an area 5 or a classification belt 3, 4, 10 or in a zooming, scrolling or shifting action. Rather, interaction with the graphical user interface 1 may alternatively result in at least temporarily displaying or hiding areas 5 or belts 3, 4, 10 or optional objects. The optional objects may represent user actions like editing, adding or deleting of data objects. Displaying or hiding may be caused by manually or automatically activating the area 5 or a belt 3, 4, 10.

Figure 3:
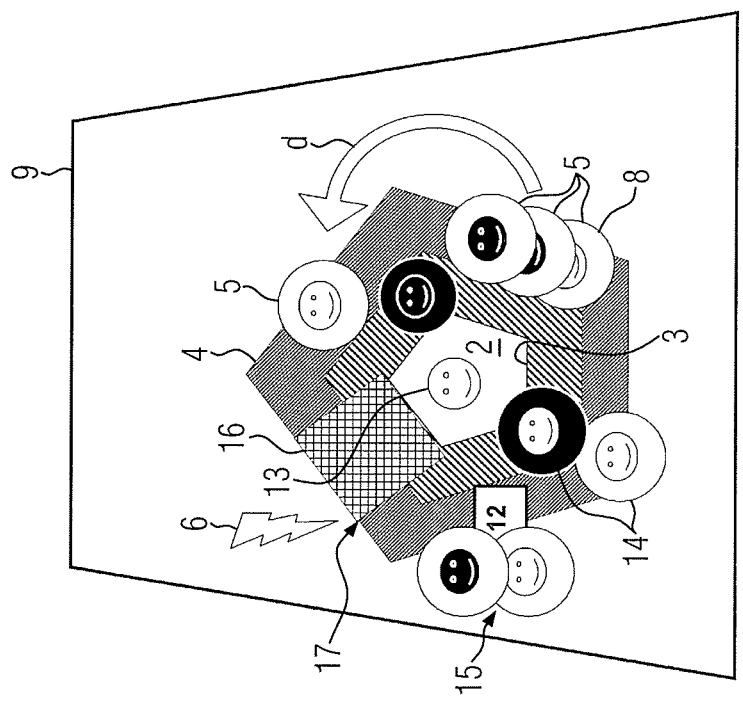
FIG. 3 is a schematic view of another exemplary embodiment of the graphical user interface with classification belts having a pentagonal view.

FIG. 3 shows a third exemplary embodiment of the graphical user interface. Same reference signs are being used for elements, which correspond in function and/or structure to the embodiment of FIGS. 1 and 2. For the sake of brevity, only the differences from the exemplary embodiments of FIGS. 1 and 2 will be looked at.

The reference area 2, the classification belts 3, 4 and the critical position marker 6 may have a different shape in some embodiments and for instance compared to the embodiments of FIGS. 1 and 2. Reference area 2 can have a trapezoidal, the classification belts 3, 4 a pentagonal and the critical position marker a flash shape.

The belt direction d can extend counter-clockwise and the task areas 5 may be thumbnail pictures. The thumbnail picture view of the task areas 5 may show scaled down pictures of contact persons of an address book of a social network. The reference area 2 may show a thumbnail picture 13 of a reference person.

The thumbnail pictures can be arranged on discs 14, which may be black or white and which may indicate the class of possible rating data entries to which the task data objects of the respective task areas 5 belongs.

Task areas can be shown in grouped views, for example, in the stack view 8 or represented by a placeholder 15. Here, three task areas 5 may be shown in the stack view 8. Twelve further task areas 5 can be displayed by the placeholder 15, which can also show the number of the task areas 5 represented by the placeholder 15.

In belt direction d before the critical position marker 6, a pre-critical area 16 may be arranged in some embodiments. The pre-critical area 16 can be visually distinguishable from the other elements of the graphical user interface 1 and may for example be shown cross-hatched. It can end at a critical angular position 17 of at least one of the classification belts 3, 4 that may be indicated by the critical position marker 6. The pre-critical area 16 needs not necessarily to extend over all classification belts 3, 4 but can cover only one or some and e.g. two classification belts 3, 4 in some embodiments.

Figure 4:
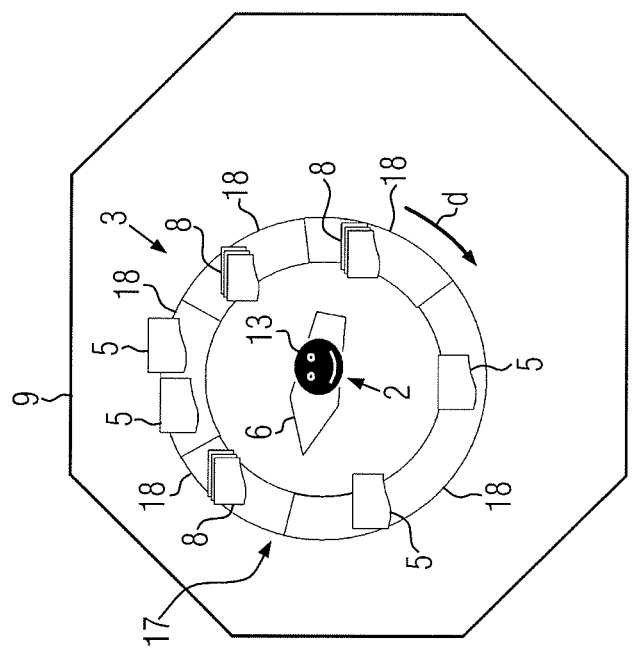
FIG. 4 is a schematic view of another exemplary embodiment of the graphical user interface, the classification belts having status sections.

FIG. 4 shows another exemplary embodiment of the graphical user interface. Same reference signs are being used for elements which correspond in function and/or structure to the embodiments of FIGS. 1 to 3. For the sake of brevity, only the differences from the exemplary embodiment of FIGS. 1 to 3 will be looked at.

The presentation area 9 may have an octagonal shape. Only one classification belt 3 with the reference area 2 may be arranged on the presentation area 9 in the concentric arrangement. The critical position marker 6 can, for example, be arranged in the central point of the concentric arrangement and point towards the critical position 17. In some embodiments, the critical position marker 6 may have the shape of an arrow.

At least the classification belt 3, another classification belt or all classification belts may in some embodiments be shown with status segments 18, which may be arranged one after the other along the respective classification belt. Each of the status segments 18 may represent a class of possible status data entries. Task areas 5 representing task data objects with the status data entries belonging to those classes may be displayed in the corresponding status segment 18. Based upon the density threshold and the density of task areas 5 in each of the status segments 18, task areas 5 can be arranged independently from one another and for example grouped in the stack view 8. The task areas 5 may at least section-wise overlap the status segment 18.

In some embodiments, reference area 2 may show a thumbnail picture 13 of a reference person and the task areas 5 can represent documents belonging to the reference person in a single or grouped view.

Figure 5:
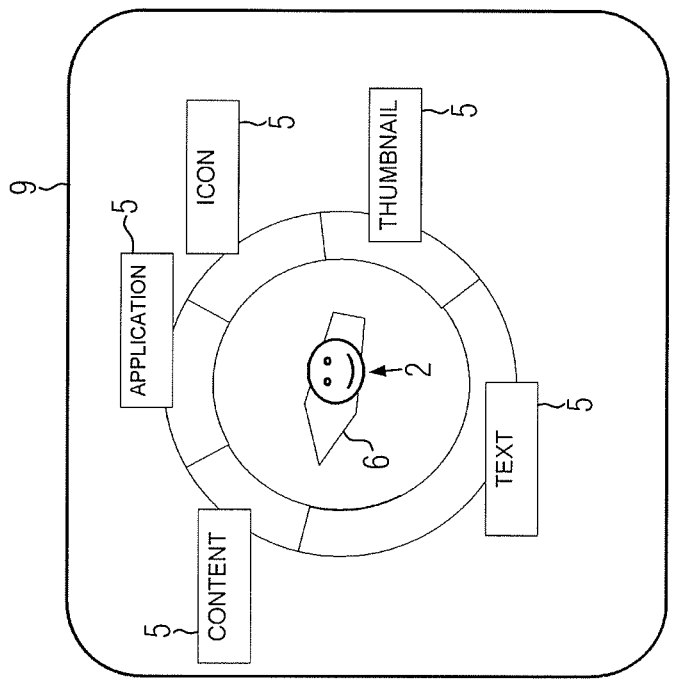
FIG. 5 is a schematic view of the exemplary embodiment of FIG. 4 with various task areas.

FIG. 5 shows the exemplary embodiment of FIG. 4. The task areas 5 may in some embodiments be shown in different views, e.g. in a content-view, an application-view, an icon view, a thumbnail picture view or a text-view. The views are represented by task areas 5 and may in some embodiments be mixed in one graphical user interface.

Figure 6:
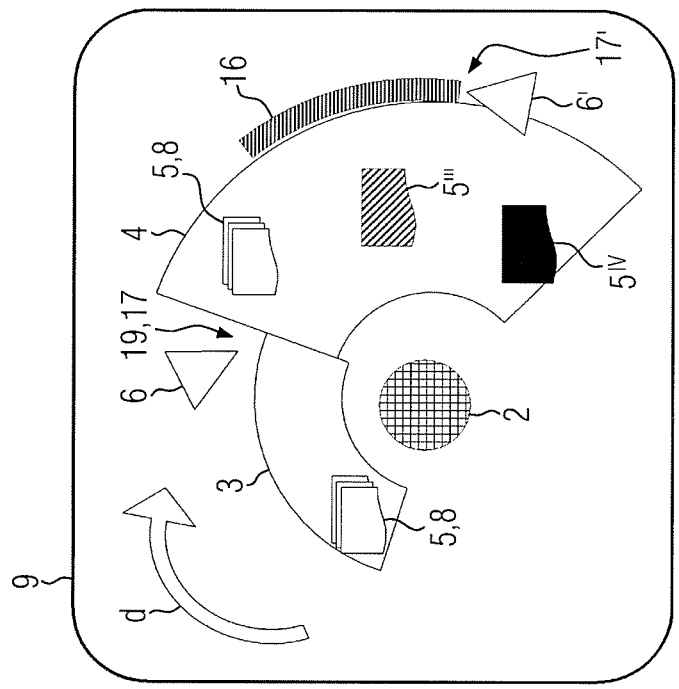
FIG. 6 is a schematic view of a further exemplary embodiment of the graphical user interface, the classification belts only partly surrounding a reference area.

FIG. 6 shows a further exemplary embodiment of the graphical user interface. Same reference signs are being used for elements, which correspond in function and/or structure to the embodiments of FIGS. 1 to 5. For the sake of brevity, only the differences from the exemplary embodiments of FIGS. 1 to 5 will be looked at.

In some embodiments, the classification belts 3, 4 and at least one optional classification belt 10 (not shown) may not completely surround the reference area 2. For example, classification belts 3, 4 can only partly surround the reference area 2 and may be arranged consecutively in the belt direction d. The distance from the reference area 2 to the first classification belt 3 can be lower than the distance between the second classification belt 4 and the reference area 2. The classification belts 3, 4 can abut against each other in belt direction d. A contact area 19, in which the classification belts 3, 4 can be in contact with each other, may be the critical position 17, which can be indicated by a critical position marker 6. Task areas 5 may be displayed in a stack view 8 or a placeholder view 15 and can move in the belt direction d towards the critical position 17. By reaching the critical position 17, the task area 5 may pass the contact area 19 and be placed on the second classification belt 4. The rating data entry of the corresponding task data object may be amended accordingly.

In the second classification belt 4, the task area 5 may further move in belt direction d, maybe towards a pre-critical area 16, which then ends at a further critical position 17' indicated by a further critical position marker 6'. As soon as the task area 5 is between the reference area 2 and the pre-critical area 16, the appearance of the task area may change, as for instance shown by task area $5^{III}$. After passing the critical position 17', the appearance of the task area can again be changed, as for instance shown by task area $5^{IV}$.

In some embodiments, the classification belts may be time-bars of a Gantt chart, in which the progress of a project is documented. The critical position markers 6, 6' may represent milestones of the project.

Figure 7:
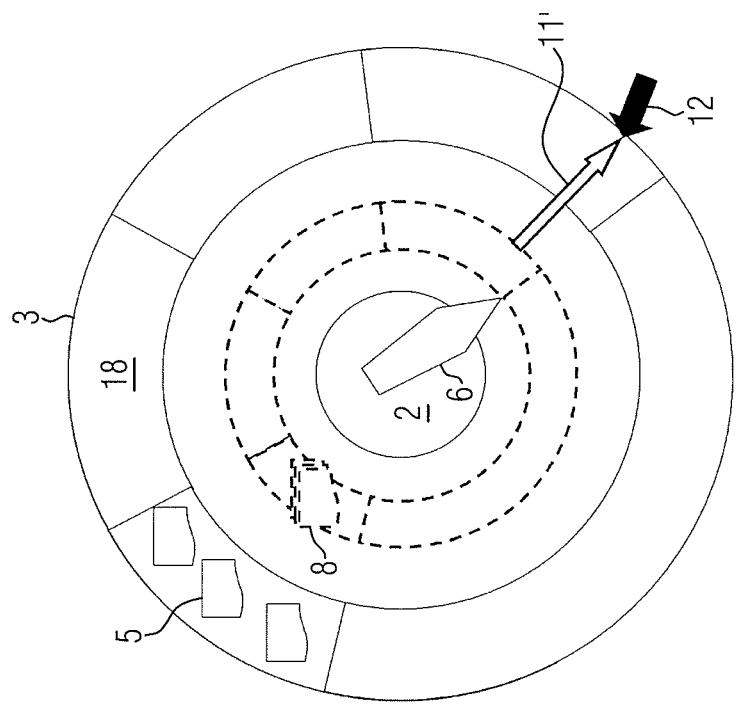
FIG. 7 is a schematic view of a further exemplary embodiment of the graphical user interface before and after radial scrolling of the classification belt.

FIG. 7 shows the exemplary embodiments of FIGS. 4 and 5 in a scrolled view. Same reference signs are being used for elements, which correspond in function and/or structure to the embodiments of FIGS. 1 to 6. For the sake of brevity, only the differences from the exemplary embodiments of FIGS. 1 to 6 will be looked at.

Navigating through a set of task data objects may be done by scrolling at least the classification belt 3. For example, the classification belt 3 may be scrolled radially, resulting in an increased or decreased diameter of the classification belt 3. If more than one classification belt 3 is present in the graphical user interface 1, the classification belt 3 can independently or together with the other optional classification belts 4, 10 be scrolled. The optional classification belts 4, 10 are omitted in FIG. 7 for sake of simplicity.

The former position of the classification belt 3 is shown in dashed lines. The scrolled position is shown by solid lines. The surface of the classification belt 3 or of one of its status segments 18 can change in proportion with the diameter of the classification belt 3. Thus, if the diameter of the classification belt 3 is increased, also the surface of the classification belt 3 or the status segment 18 may increase. Hence, the density of task areas 5 in the classification belt 3 or the status segment 18 can decrease, such that it may drop below the density threshold and task areas 5 originally shown in a stack view 8 are displayed independently of each other after scrolling.

Scrolling may be done by a drag-and-drop action by gripping the classification belt 3 and moving the gripped point away or towards the reference area 2. Gripping and holding is illustrated by the black arrow 12, which again can be a mouse pointer. The movement of the classification belt 3 is indicated by movement arrow 11'.

Enlarging the diameter of the classification belt 3 equals zooming, such that task areas 5 can easily be accessed independently.

Figure 8:
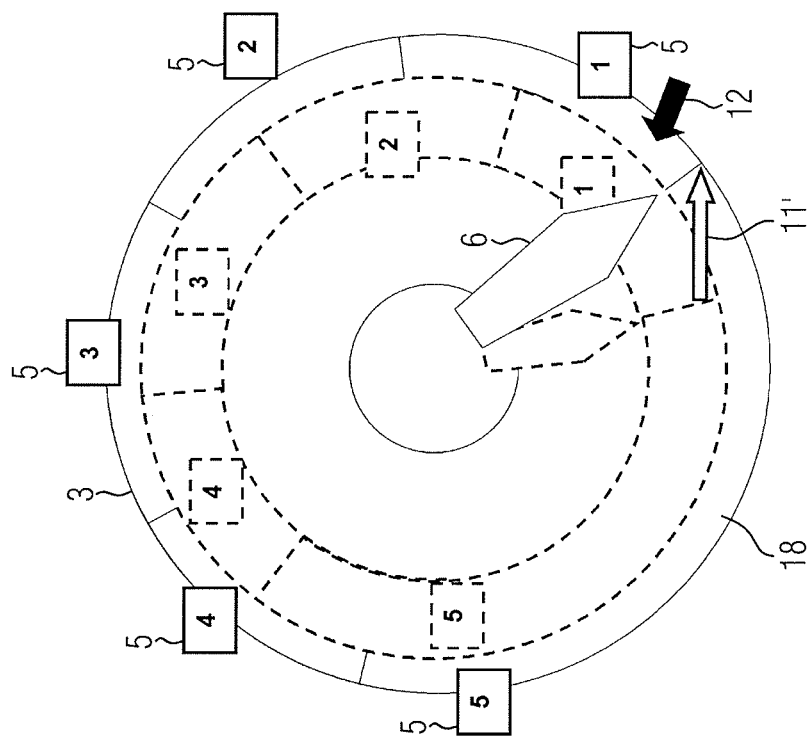
FIG. 8 is a schematic view of a further exemplary embodiment of the graphical user interface, showing the classification belts before and after radial and rotational scrolling.

FIG. 8 is another exemplary embodiment of FIGS. 4, 5 and 7. Same reference signs are being used for elements, which correspond in function and/or structure to the embodiments of FIGS. 1 to 7. For the sake of brevity, only the differences from the exemplary embodiments of FIGS. 1 to 7 will be looked at.

Task areas 5 show as an example the number of the class of possible status data entries represented by each status segment 18. The classification belt 3 is radially scrolled, as indicated by black arrow 12 and movement arrow 11'. The former position of the classification belt 3 is shown in dashed lines. The scrolled position is shown by solid lines. Further to the radial scrolling, the classification belt may also be scrolled rotationally, in particular, around the centroid of the concentric arrangement. In some embodiments, the classification belt 3 can be rotationally scrolled counter-clockwise or clockwise. The critical position marker 6 may be scaled and moved with the scrolling movement of the classification belt 3.

Figure 9:
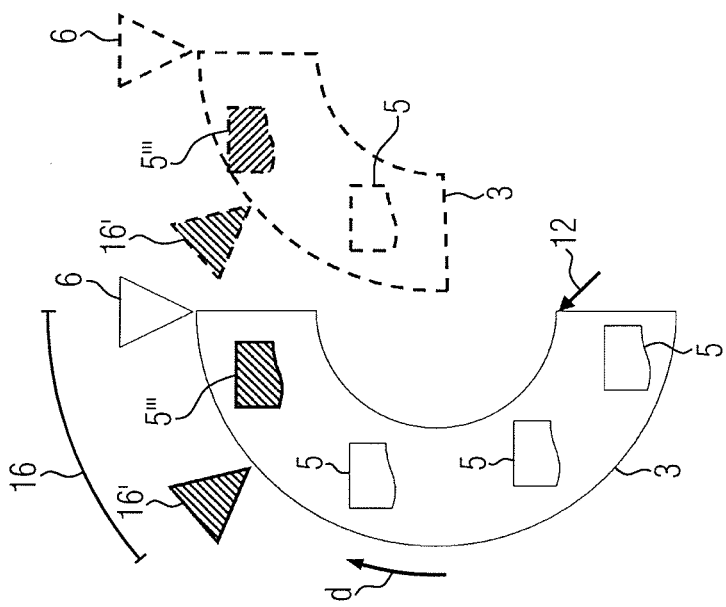

FIG. 9 shows another exemplary embodiment of the graphical user interface. Same reference signs are being used for elements, which correspond in function and/or structure to the elements of FIGS. 1 to 8. For the sake of brevity, only the differences from the exemplary embodiments of FIGS. 1 to 8 will be looked at.

Scrolling and/or zooming the classification belt 3 may be done by changing the length of the classification belt 3 along the belt direction d. For example, the length of the classification belt 3 can be changed in or against the belt direction d and can result in displaying more or less task areas 5. For example, the length of the classification belt 3 can be changed by a drag-and-drop action. In the unscrolled and/or unzoomed status of the classification belt 3, which is displayed by dashed lines, only two task areas 5 may for example be displayed in the classification belt 3. The classification belt 3 extends around a reference area 2 (not shown) by 90°. The task area 5 is arranged outside of the pre-critical area 16, which is delimited by a pre-critical area marker 16' and the critical position marker 6. The task area 5111 is shown in between the pre-critical marker 16' and the critical position marker 6. The appearance of the task area $5^{III}$ differs from the appearance of task area 5.

In the scrolled and/or zoomed status, the task area 5 may for instance extend around the reference area 2 by 180°.

The scrolled and/or zoomed classification belt 3 offers more space, such that two additional classification belts 5 are visible. The enlarged length of the classification belt 3 along the belt direction d may enable showing task areas 5 in a larger distance to the critical position marker 6. This may be equivalent to taking a look at task areas 5 that will become critical further in future. The enlarged classification belt 3 may represent a longer time period.

Figure 10:
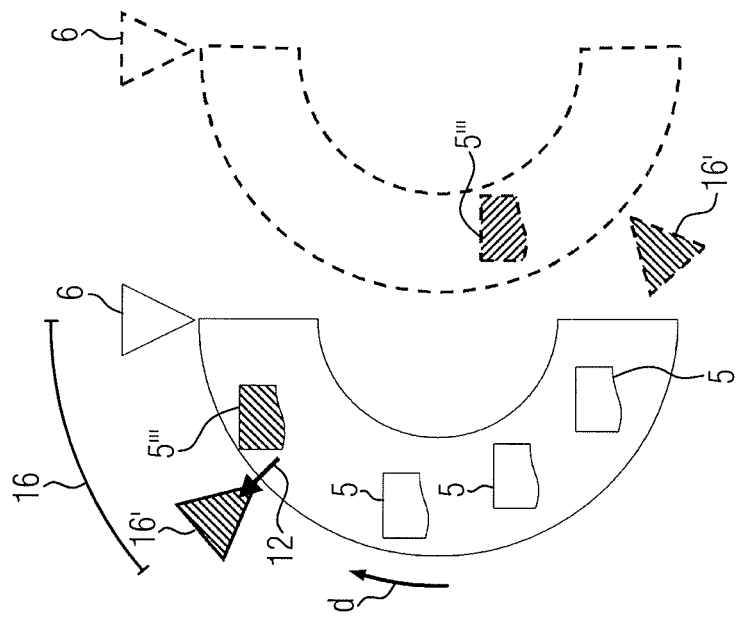
FIGS. 9-11 are schematic views of further exemplary embodiments of the graphical user interface, showing a classification belt before and after rotational scrolling.

FIG. 10 shows another exemplary embodiment of the graphical user interface. Same reference signs are being used for elements, which correspond in function and/or structure to the embodiments of FIGS. 1 to 9. For the sake of brevity, only the differences from the exemplary embodiments of FIGS. 1 to 9 will be looked at.

Scrolling can in some embodiments be done by zooming, i.e. by changing the scale of the classification belt 3. This may for example be done by changing the length of the pre-critical area 16, e.g. by moving the pre-critical marker 16 away or towards the critical position marker 6 again or in the belt direction d. Again, a pre-scrolled state is shown by dashed lines and the scrolled state is shown by solid lines. In order to take a look at future task areas 5, the pre-critical marker 16' may be moved towards the critical position marker 6.

By moving the pre-critical marker 16' towards the critical position marker 6, the length of the pre-critical area 16 may be reduced. Still, the pre-critical area 16 can represent the same length of time or the same amount of actions to be fulfilled. Yet, by moving the pre-critical marker 16', the scale of the classification belt 3 may change giving more room for future task areas 5. In this embodiment, the length of the classification belt 3 may remain unchanged.

Figure 11:
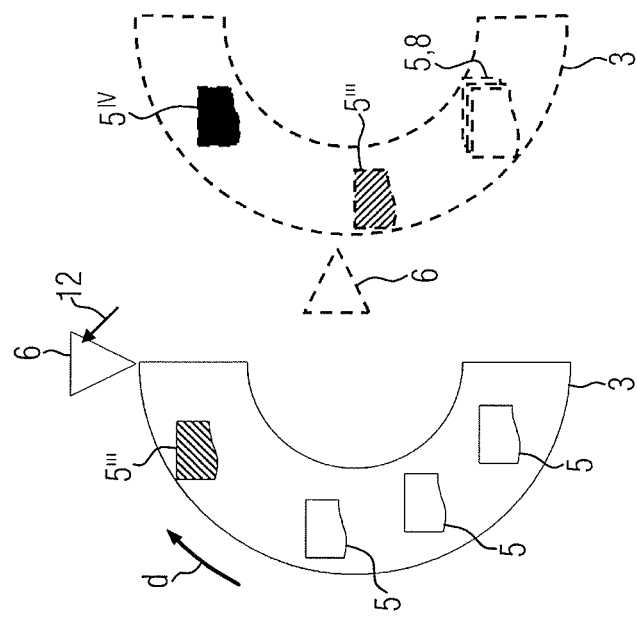

FIG. 11 shows another exemplary embodiment of the graphical user interface. Same reference signs are being used for elements which correspond in function and/or structure to the embodiments of FIGS. 1 to 10. For the sake of brevity, only the differences from the exemplary embodiments of FIGS. 1 to 10 will be looked at.

In some embodiments, the period displayed by the classification belt 3, may be replaced by another period, e.g. by moving the period. For example, the period can be moved by sliding the critical position marker 6 in or against the belt direction d. By sliding the critical position marker 6, the scale of the classification belt 3 may in addition change, such that a longer period of time or more actions to be done can be shown on the classification belt 3. Alternatively, the scale may not change and moving the critical position marker 6 may result in moving through the task areas 5. By moving the critical position marker 6 against the belt direction d, task areas $5^{IV}$ that have already passed the critical position marker 6 may become visible. By moving the critical position marker 6 in belt direction d, these overdue task areas $5^{IV}$ may be moved out of the classification belt 3 or may be shown in a grouped view, for instance, in the stacked view 8.

Furthermore, task areas 5 arranged before the critical position marker 6 in the belt direction d can either be moved or grouped.

Figure 12:
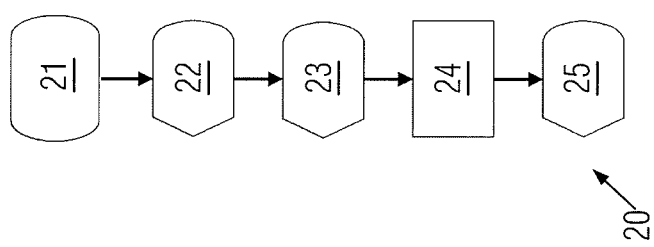

FIG. 12 shows a flowchart of a possible implementation of a computer-implemented method 20 for providing access to task data objects via a graphical user interface 1. Same reference signs are being used for elements, which correspond in function and/or structure to the embodiments of FIGS. 1 to 11. For the sake of brevity, only the differences from the exemplary embodiments of FIGS. 1 to 11 will be looked at.

The method 20 may begin at step 21. At step 22, a computing device hosting the graphical user interface 1 may display a reference area 2 on the graphical user interface 1. For example, the reference area 2 may represent a reference data object and may be presented as an icon, a thumbnail picture, a link to an executable application or program, a scaled down content of a file or as text. The reference area 2 may be placed upon a predetermined or a user-chosen region of the graphical user interface 1 that may be movable on the graphical user interface 1.

At step 23, the computing device may display at least two classification belts 3, 4. The at least two classification belts 3, 4 can be displayed in a concentric arrangement with the reference area 2, i.e. the centres of the at least two classification belts 3, 4 and the reference area 2 can coincide.

The classification belts 3, 4 can least partly or completely surround the reference area 2 and can at least section-wise, have the shape of a ring, an ellipse, a polygon or a star. If the classification belts 3, 4 only partly surround the reference area 2, they can have the shape of a section or part of a ring, ellipse, polygon or a star and they can be arranged consecutively in belt direction d.

At step 24, the computing device can compare a rating data entry with at least two rating classes of possible rating data entries. Each class may be associated with one of the at least two classification belts 3, 4. For example, the rating data entries of task data objects can be compared with the classes, each task data object being represented by a task area. Each rating data entry can at least be an element of one of the at least two rating classes.

Based on the comparison, the task areas 5 can be displayed on at least one of the at least two classification belts 3, 4 at step 25. In particular, task areas representing task data objects belonging to a certain class may be shown on the classification belts 3, 4 that are associated with the certain class.

Figure 13:
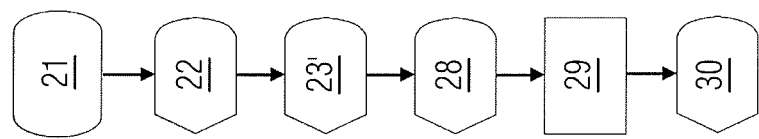
FIGS. 12-13 are flowcharts of methods for providing access to task data objects via a graphical user interface.

FIG. 13 is a flowchart of a further possible implementation of a method 27 for providing access to task data objects via a graphical user interface 1, wherein the method may begin at step 21. Same reference signs are being used for elements, which correspond in function and/or structure to the embodiments of FIGS. 1 to 12. For the sake of brevity, only the differences from the exemplary embodiments of FIGS. 1 to 12 will be looked at.

Furthermore, this method may comprise step 22, at which a reference area is displayed on the graphical user interface.

At step 23', the computing device may display at least one classification belt 3. The at least one classification belt 3 may be shown in a concentric arrangement with the reference area 2, i.e. the centres of the at least one classification belt 3 and the reference area 2 can coincide.

The classification belt 3 can at least partly or completely surround the reference area 2 and can at least section-wise, have the shape of a ring, ellipse, polygon or a star. If the classification belt 3 only partly surrounds the reference area 2 it can have the shape of a section or part of the ring, ellipse, polygon or a star.

At step 28, the computing device may display a critical position marker 6 in a predetermined angular position with respect to the reference area 2. The critical position marker 6 may indicate a critical position 17, 17' on the classification belt 3.

The predetermined angular position may be the 12 o'clock position of the graphical user interface 1 or in between the 12 o'clock position and the reference area 2. The position of the critical position marker 6 may be alterable automatically or manually. For example, the critical position marker 6 may represent a target or goal or the end of the time interval or countdown via a target data entry. The target data entry may be a limit value of status data entries that are represented by the angular position.

At step 29, the computing device may compare status data entries with the target data entry. For example, the computing device may determine the difference between the status data entry and the target data entry.

Based on the result of step 29, the computing device may display at least one task area 5 in an angular distance and along the belt direction d to the critical position marker 6 at step 30. For instance, the angular distance can represent a difference between the status data entry and the limit value expressed in the target data entry and may be proportional or inverse proportional, to the result of the comparison.

Figure 14:
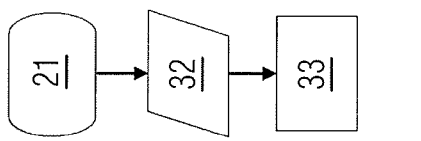

FIG. 14 is a flowchart displaying a method 31 with further steps that may be added to the method shown in FIG. 13. Same reference signs are being used for elements, which correspond in function and/or structure to the embodiments of FIGS. 1 to 13. For the sake of brevity, only the differences from the exemplary embodiments of FIGS. 1 to 13 will be looked at.

At step 21, the method may start. For example, method 31 can be appended to the last step 30 of the method 27.

At step 32, the computing device may generate or receive a trigger event. The trigger event may be one event of a list containing a user data entry, an end of a predetermined interval event or an automatically generated data entry event.

Upon the trigger event, the computing device may, in step 33, update the status data entry, such that the distance between the task area 5 and the critical position marker 6 increases or decreases.

Figure 15:
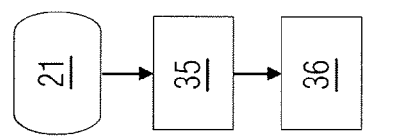
FIGS. 14-15 are schematic views of further exemplary embodiments of the method for providing access to task data objects.

FIG. 15 is the flowchart displaying a method 34 with further steps that may be added to the method 27 shown in FIG. 13. Same reference signs are being used for elements, which correspond in function and/or structure to the embodiments of FIGS. 1 to 14. For the sake of brevity, only the differences from the exemplary embodiments of FIGS. 1 to 14 will be looked at.

At step 21, the method may start. For example, step 21 can be appended to the last step 30 of FIG. 13.

At step 35, the computing device may compare the status data entry of at least one task data object with the limit value. For example, the result of the comparison may be that the status data entry is beyond the limit value, i.e. above or below the limit value.

A further step 36 may be executed based on that comparison. If the status data entry is beyond the limit value, the at least one further step 36 may for example be executed by the computing device. The further step 36 may be a step of a list containing giving a visual or audible signal, changing the appearance of the task area and changing a rating data entry of the task data object or of another data object to the reference data object type.

Figure 16:
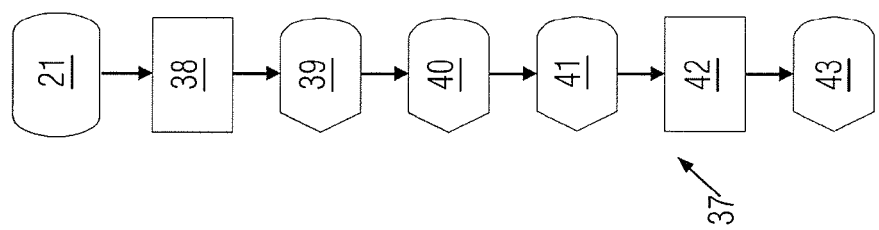

FIG. 16 is a flowchart of an implementation of a computer-implemented method 37 for navigating through a set of task data objects on a graphical user interface 1. Same reference signs are being used for elements, which correspond in function and/or structure to the embodiment of FIGS. 12 to 15. For the sake of brevity, only the differences from the exemplary embodiments of FIGS. 12 to 15 will be looked at.

The method 37 may begin at step 21 and can comprise a further step according to methods 20 or 27 for providing access to task data objects or resulting in a graphical user interface according to any of FIGS. 1 to 11.

At step 38, a set of task data objects, which may be predefined or chosen by the user, can be accessed. For instance, the user may select a reference data object and task data objects that are linked to the reference data object by a reference link and data entry may be gathered from a database in order to form the set of task data objects. The set of task data objects can be represented on the graphical use interface according to method 20 or 27.

At step 39, the reference area 2 can, at least section-wise, be displayed on the graphical user interface 1 and in particular, on the presentation area 9.

At step 40, at least one or at least two classification belts 3, 4 may, at least section-wise, be shown on the graphical user interface 1 and in particular, on the presentation area 9 by the computing device. For example, the classification belts 3, 4 can be shaped and arranged as explained above or resulting in the graphical user interface as laid out above.

At least one task area 5 can be displayed on at least one of the classification belts 3, 4 at step 41 and for instance according to method 20 or 27. The task area 5 can be arranged on the classification belts 3, 4 based on rating and/or status data entries of the task data object it represents as explained above.

The method of navigating may comprise a further step 42, at which the at least one or the at least two classification belts 3, 4 may independently or together be radially scrolled.

At the following step 43, the at least one classification belt 3 or the at least two classification belts 3, 4 may be displayed with an increased or decreased average diameter. For instance, radial scrolling can be done by changing the diameter of one or all classification belts 3, 4 via a drag-and-drop action using a mouse or another input device, which may in some implementations or embodiments also be a touch screen that can interpret single-finger or multiple-finger input.

The change in diameter may be displayed after the input has finished or continuously during the input. Furthermore, the way the task areas 5 are displayed can change, if the density of task areas 5 in a classification belt 3, 4 or in one of its sections 18 exceeds or falls below a threshold value at least after the input has finished as explained above for the graphical user interface 1. For example, at least two task areas can be displayed separately, in a stack view or by a placeholder.

Furthermore, the classification belts 3, 4 may be scrolled by moving at least one or all classification belts 3, 4 around a predefined point. For instance, the predefined point may be the centre, the mid-point or the centroid of the classification belts 3, 4, which can thus be rotated around the predefined point. Rotational scrolling may lead to displaying another period in the classification belt 3, 4 or to changing the scale of the classification belts 3, 4. By scaling, the displayed period may be enlarged or reduced without changing the size of the classification belts 3, 4.

Figure 17:
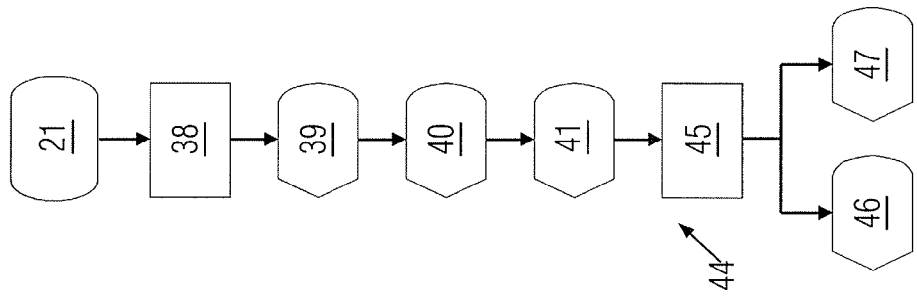
FIGS. 16-17 are flowcharts of methods for navigating through a set of task data objects on a graphical user interface.

FIG. 17 is a flowchart of a further implementation of the computer-implemented method 44 for navigating through a set of task data objects on a graphical user interface. Same reference signs are being used for elements, which correspond in function and/or structure to the embodiments of FIGS. 1 to 16. For the sake of brevity, only the differences from the exemplary embodiments of FIGS. 1 to 16 will be looked at.

The method may begin at step 21 and can comprise a further step according to the method 20 or 27 for providing access to a task data object.

Furthermore, method 44 may comprise steps 38 to 41. The set of task data objects can be represented on the graphical use interface according to method 20 or 27 e.g. after step 40.

Method 44 for navigating may further comprise a step 45, at which at least one task area 5 is moved to the reference area 2. For example, the task area 5 may be moved by a user action, e.g. a drag-and-drop action or a data entry. Alternatively, the task area 5 may be moved automatically, e.g. as a result of the content of a database or due to a certain status data entry. The task data object represented by the moved task area 5" can become a replacement reference object for the former reference data object. In the following, at least one of two steps can be executed. Alternatively, the at least one task area 5 can be moved from the reference area 2 or one of the at least one classification belts 3, 4, 10 to one of the at least one classification belts 3, 4, 10. Movement of the task area 5 can be caused by the trigger event 32, which may be a remote trigger event that is transmitted via a network, e.g. a digital network, or by an interaction between the user, e.g. performing a gesture, and the graphical user interface 1.

At a first step 46, at least one task area 5 can be displayed on the graphical user interface 1 according to the above and may be arranged based on status and/or rating data entries of the task data object it represents. The task data object may be linked to the replacement reference object by a reference link data entry.

At a second step 47, which may be executed before, after or simultaneously with the first step 46, a critical position marker 6 can be displayed that may be linked to the replacement reference object 5" via its critical position data object.

Figure 18:
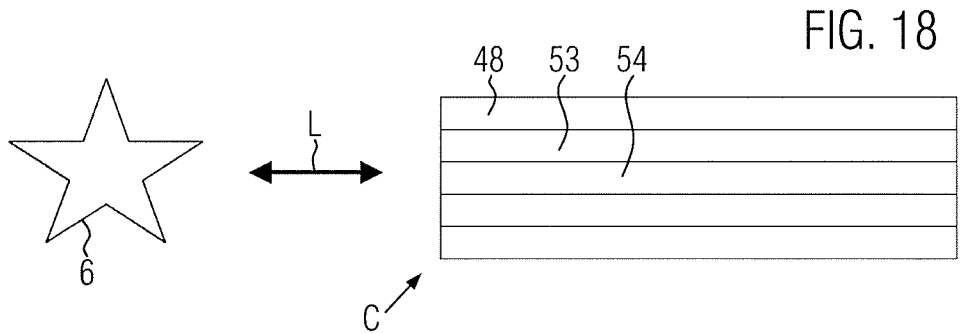
FIGS. 18-20 area schematic views of data objects.
Figure 19:
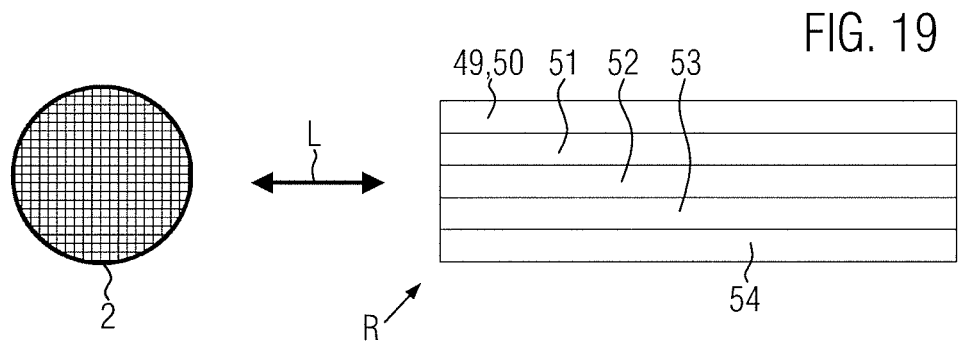
Figure 20:
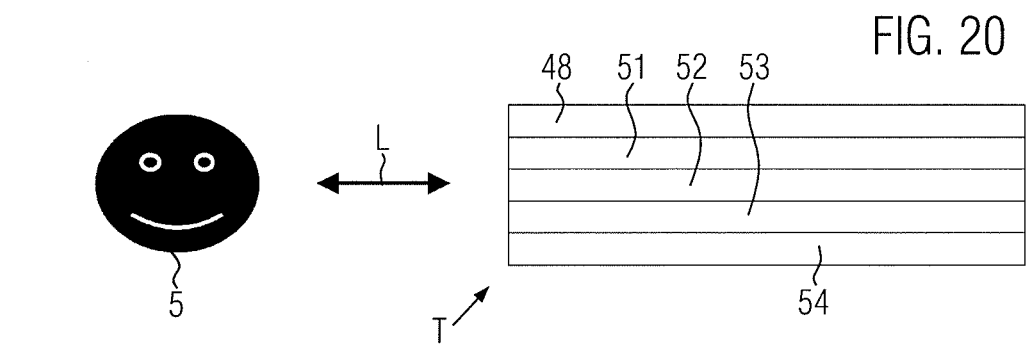

FIGS. 18 to 20 are schematic views of possible embodiments of data objects. Same reference signs are being used for elements, which correspond in function and/or structure to the embodiments of FIGS. 1 to 17. For the sake of brevity, only the differences from the exemplary embodiments of FIGS. 1 to 17 will be looked at.

Data entries of data objects may be alphanumerical data. Next to the data entries disclosed in this document, data objects may comprise other data entries of the same or of another format as the data entries described below. For example, the data entries may additionally comprise control data, regular data and/or a link to files, e.g. containing pictures or other multimedia data.

In some embodiments, a data objects may comprise at least one link data entry for linking the data objects to other data objects. For example, critical position data objects C and/or task data objects T may comprise reference link data entries 48, which link the critical position C and task data objects T to at least one reference data object R. The reference data object R may comprise at least one task 49 and/or critical position link data entry 50. Link data entries 48, 49, 50 may comprise lists of linked data objects, pointers or and other forms of linking information.

In some embodiments, at least task data objects T can comprise rating data entries 51, which may represent the quality of the relationship between the task data object T and the reference data object T. The relationship may be represented by the task and/or reference link data entry 48, 49. Furthermore, at least task data objects T may comprise status data entries 52 that may represent the status of the task data object T with respect to a certain target or goal.

Reference data objects R may also comprise rating data entries 51 and status data entries 52 in some embodiments.

Target data entries 53 may in some embodiments be present in reference data objects R, task data objects T or critical position data objects C. Target data entries 53 may for example be a limit value with the same format as status data entries 52.

Reference data objects R, task data objects T or critical position data objects C may in some embodiments comprise type data entries 54. Type data entries 54 may for example define the type of a data object.

In some embodiments, links L may be provided, that may connect task data objects T to task areas 5, reference data objects R to reference areas 2 and critical position data objects C to critical position markers 6, 6'. Links L may be provided as data entries of data objects or of task areas 5, reference areas 2 or critical position markers 6, 6'

Figure 21:
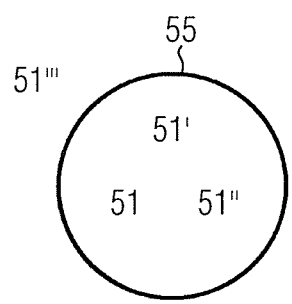
FIGS. 21-22 are schematic views of classes of possible data entries.
Figure 22:
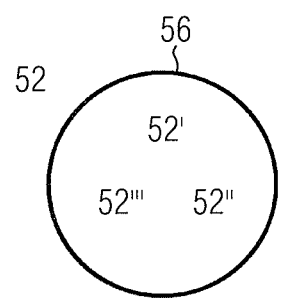

FIGS. 21 and 22 are schematic views of possible embodiments of classes of possible data entries. Same reference signs are being used for elements, which correspond in function and/or structure to the embodiments of FIGS. 1 to 20. For the sake of brevity, only the differences from the exemplary embodiments of FIGS. 1 to 20 will be looked at.

Classes of possible data entries may comprise a selection of data entries of the same type. The selection may be arbitrarily or may comprise a range of data entries. The selection may comprise a coherent or continuous lot of possible data entries. Several classes of one type of possible data entries can have a gap in between, they can abut against each other or they may even overlap each other.

In some embodiments, a class 55 may comprise possible rating data entries. For example, rating data entries 51, 51', 51" can belong to the class 55. A rating data entry 51''' may not belong to the class 55. The rating class 55 may comprise more or less than the rating data entries 51, 51', 51".

A class 56 may comprise possible status data entries. For example, status data entries 52', 52", 52''' can belong to the class 56. The rating data entry 52 may not belong to the class 56. The rating class 56 may comprise more or less than the rating data entries 52', 52", 52'''.

The invention claimed is:

1. A graphical user interface, comprising
   a presentation area the presentation area including:
   a reference area that is representative of a reference data object;
   at least two classification belts including a first and a second classification belt, the first and the second classification belt at least partly surrounding the reference area in a concentric arrangement and the first classification belt being arranged at a smaller distance to the reference area than the second classification belt; and
   at least one task area that is representative of a task data object, the task data object and the reference data object being linked to each other and having a known relation that is represented by at least one rating data entry;
   wherein each of the at least two classification belts represents a rating class of possible rating data entries; and
   wherein the task area is located in the classification belt, the rating class of which comprises the rating data entry of the task data object represented by the task area.

2. The graphical user interface according to claim 1, wherein the task area is adapted to be moveable between the at least two classification belts and that the rating data entry is alterable.

3. The graphical user interface according to claim 1, wherein the task area is adapted to be moveable from the at least two classification belts to the reference area as a replacement object for the reference data object.

4. The graphical user interface according to claim 3, wherein at least one further task area representing one further task data object is located in one of the at least two classification belts, the further task data object being linked to the replacement object as reference data object.

5. The graphical user interface according to claim 1, comprising several task areas, each task area being arranged in the classification belt that represents the rating class that comprises the rating data entry of the task data object that is represented by the task area.

6. The graphical user interface according to claim 1, wherein the at least one task area is displayed as one view of a list containing an icon view, a thumbnail picture view, a content view and an application view.

7. The graphical user interface according to claim 1, wherein at least two task areas of task data objects belonging to the same rating class are in dependence on an object density threshold displayed in one view of a list containing a stack view and a placeholder view.

8. The graphical user interface according to claim 1, wherein the graphical user interface comprises a critical position marker that is adapted to indicate a predetermined angular position with respect to the reference area.

9. A display with a graphical user interface, comprising:
   a presentation area, the presentation area including:
   a reference area that is representative of a reference data object;
   at least one classification belt, which at least partly surrounds the reference area in a concentric arrangement;
   at least one task area that is representative of a task data object, the task data object and the reference data object being linked to each other and the task area being located in the at least one classification belt; and
   at least one critical position marker, which is arranged at a predetermined angular position, the critical position marker representing a fixed limit value of a status data entry of the task data object,
   wherein the difference between the limit value and the status data entry is represented by an angular distance between the task area and the critical position marker.

10. The display with the graphical user interface according to claim 9, wherein the predetermined angular position is the twelve o'clock position.

11. The display with the graphical user interface according to claim 9, wherein a pre-critical area extends in a belt direction parallel to the at least first classification belt and ends at the critical position marker, the pre-critical area having a length between 15° and 45° around the reference area.

12. The display with the graphical user interface according to claim 11, wherein the pre-critical area extends between the twelve o'clock and the eleven o'clock positions.

13. The display with the graphical user interface according to claim 9, wherein the task area is movable in a classification belt direction along which the classification belt extends and towards the critical position marker in dependence on a trigger event.

14. The display with the graphical user interface according to claim 9, the graphical user interface comprising:
several task areas, each task area being representative of a task data object being allocated to a certain status class of possible status data entries, wherein the task data objects belonging to the same status class are displayed as a grouped view.

15. The display with the graphical user interface according to claim 9, wherein the at least one classification belt is at least sectionwise formed having one shape of a list containing a circular shape, a polygonal shape and a star-like shape.

16. A computer-implemented method for providing access to task data objects via a graphical user interface, the method comprising the steps of:
displaying within the graphical user interface:
a reference area for a reference data object; and
at least two classification belts in a concentric arrangement and at least partially surrounding the reference area;
comparing a rating data entry with at least two rating classes of possible rating data entries, each class being associated to one of the at least two classification belts;
displaying the at least one task area with one of the at least two classification belts based on the comparison;
accessing the set of task data objects;
at least sectionwise displaying on the graphical user interface:
the reference area;
at least one of the at least two classification belts; and
the at least one task area representing one task data object of the set of task data objects; and
radially scrolling the at least one classification belt over the presentation area, wherein by radial scrolling of the classification belt, an average diameter of the classification belt is being increased or decreased.

17. A computer-implemented method for providing access to task data objects via a graphical user interface, the method comprising the steps of:
displaying within the graphical user interface:
a reference area for a reference data object;
at least one classification belt in a concentric arrangement with and at least partially surrounding the reference area; and
at least one critical position marker in a predetermined angular position with respect to the reference area;
comparing a status data entry with a limit value; and
displaying the at least one task area on the at least one classification belt at an angular distance to the critical position marker, the angular distance being representative of a result of the comparison of the status data entry and the limit value.

18. The method according to claim 17, wherein the status data entry is being updated upon a predetermined trigger event, which is one event of a list containing a data entry event and an end of a predetermined interval event.

19. The method according the claim 17, wherein if the status data entry is beyond the limit value, at least one further step is being executed, the further step being a step of a list containing giving a signal, changing the appearance of the task area, changing a rating data entry of the task data object and moving the task area to the reference area.

20. A computer-implemented method for navigating through a set of task data objects on a graphical user interface, the method comprising the steps of claim 17,
the method further comprising the steps of:
accessing the set of task data object;
at least sectionwise displaying on the graphical user interface:
the reference area;
the at least one classification belt; and
the at least one task area representing one task data object of the set of task data objects; and
radially scrolling the at least one classification belt over the presentation area, wherein by radial scrolling of the classification belt, an average diameter of the classification belt is being increased or decreased.

21. A computer-implemented method for navigating through a set of task data objects on a graphical user interface, the method comprising the steps of claim 16,
the method further comprising the steps of:
accessing a task data object set being navigate;
displaying at least sectionwise on the graphical user interface:
the reference area;
at least one of the at least two classification belts; and
the at least one task area representing one task data object of the set of task data objects;
moving the at least one task area to the reference area; and
executing a step, the step comprising:
refreshing the graphical user interface with task areas representing task data objects that are linked to the at least one task data object.

22. A computer-implemented method for navigating through a set of task data objects on a graphical user interface, the method comprising the steps of claim 17,
the method further comprising the steps of:
accessing a task data object set being navigate;
displaying at least sectionwise on the graphical user interface:
the reference area;
the at least one classification belt;
the at least one critical position marker; and
the at least one task area representing one task data object of the set of task data objects; and
moving the at least one task area to the reference area; and
executing a step, the step comprising:
moving the at least one critical position marker based on a target data entry of the task data object represented by the at least one task area.

23. A computing device having a display, the computing device comprising:
a graphical user interface according to claim 1.

24. A computing device having a display, the computing device comprising:
a graphical user interface according to claim 9.

25. A computing device having a display with a graphical user interface, the computing device comprising:
code executable to display task data objects on the graphical user interface according to a method according to claim 16.

26. A computing device having a display with a graphical user interface, the computing device comprising:
code executable to display task data objects on the graphical user interface according to a method according to claim 17.

27. A non-transitory computer readable medium storing instructions that are executable by a processing device and upon such execution cause the processing device to carry out a method according to claim 16.

28. A non-transitory computer readable medium storing instructions that are executable by a processing device and upon such execution cause the processing device to carry out a method according to claim 17.

29. A computer-implemented method for navigating through a set of task data objects on a graphical user interface,
the method comprising the steps of claim 16,
the method further comprising the steps of:
   accessing a task data object set being navigated;
   displaying at least sectionwise on the graphical user interface:
      the reference area;
      at least one of the at least two classification belts; and
      the at least one task area representing one task data object of the set of task data objects;
   moving the at least one task area to another one of the classification belts; and
   executing a step, the step comprising:
      changing the entry of at least the task data object represented by the moved task area.

30. A computer-implemented method for navigating through a set of task data objects on a graphical user interface,
the method comprising the steps of claim 17,
the method further comprising the steps of:
   accessing a task data object set being navigated;
   displaying at least sectionwise on the graphical user interface:
      the reference area;
      the at least one classification belt;
      the at least one critical position marker; and
      the at least one task area representing one task data object of the set of task data objects; and
   moving the at least one task area to another angular distance to the critical position marker within the classification belt; and
   executing a step, the step comprising:
      changing the entry of at least the task data object represented by the moved task area.

\* \* \* \* \*

UNITED STATES PATENT AND TRADEMARK OFFICE
CERTIFICATE OF CORRECTION

PATENT NO.       : 8,584,041 B2
APPLICATION NO.  : 12/856313
DATED            : November 12, 2013
INVENTOR(S)      : Dirk Gamboa Tuesta et al.

Page 1 of 1

It is certified that error appears in the above-identified patent and that said Letters Patent is hereby corrected as shown below:

In the Specification
Column 14, Line 17, change "5111" to --$5^{III}$--

In the Claims
Column 22, Line 2, change "object" to --objects--
Column 22, Line 17, change "navigate" to --navigated--
Column 22, Line 34, change "navigate" to --navigated--

Signed and Sealed this
Seventeenth Day of February, 2015

Michelle K. Lee
*Deputy Director of the United States Patent and Trademark Office*